United States Patent [19]

Sartori et al.

[11] Patent Number: 5,177,296
[45] Date of Patent: Jan. 5, 1993

[54] SATURATED POLYESTERS AND CROSSLINKED MEMBRANES THEREFROM FOR AROMATICS/SATURATES SEPARATION

[75] Inventors: Guido Sartori; W. S. Winston Ho, both of Annandale; Bruce H. Ballinger, Bloomsbury, all of N.J.

[73] Assignee: Exxon Research and Engineering Company, Florham Park, N.J.

[21] Appl. No.: 868,929

[22] Filed: Apr. 16, 1992

Related U.S. Application Data

[62] Division of Ser. No. 775,886, Oct. 11, 1991, Pat. No. 5,128,439.

[51] Int. Cl.⁵ .............................................. C07C 7/144
[52] U.S. Cl. ................................. 585/819; 528/272; 528/274; 528/300; 528/302; 528/305; 528/308; 528/308.6; 524/364; 210/640; 210/649; 210/654; 585/818
[58] Field of Search ............... 528/272, 274, 300, 302, 528/303, 305, 308, 308.6; 524/364; 210/640, 649, 654; 585/818, 819

[56] References Cited

U.S. PATENT DOCUMENTS

| | | | |
|---|---|---|---|
| 2,930,754 | 3/1960 | Stuckey | 585/819 |
| 2,958,656 | 11/1960 | Stuckey | 585/819 |
| 3,370,102 | 2/1968 | Carpenter et al. | 585/819 |
| 4,115,465 | 9/1978 | Elfert et al. | 585/819 |
| 4,342,859 | 8/1982 | Harada et al. | 528/64 |
| 4,944,880 | 7/1990 | Ho et al. | 210/640 |
| 4,946,594 | 7/1990 | Ho et al. | 210/640 |
| 4,976,868 | 12/1990 | Sartori et al. | 210/640 |
| 4,990,275 | 2/1991 | Ho et al. | 252/62.3 |
| 4,997,906 | 3/1991 | Thaler et al. | 528/272 |
| 5,012,035 | 4/1991 | Sartori et al. | 585/819 |
| 5,012,036 | 4/1991 | Sartori et al. | 585/819 |
| 5,019,666 | 5/1991 | Sartori et al. | 585/819 |

Primary Examiner—John Kight, III
Assistant Examiner—Sam A. Acquah
Attorney, Agent, or Firm—Ronald D. Hantman

[57] ABSTRACT

The present invention describes a method for the synthesis of saturated aliphatic polyesters by reaction of saturated or aromatic diacid chlorides with oligomeric aliphatic polyester diols, a method to thermally crosslink membranes prepared from the above saturated aliphatic polyesters, and the use of the crosslinked membranes to separate aromatics from saturates.

4 Claims, No Drawings

SATURATED POLYESTERS AND CROSSLINKED MEMBRANES THEREFROM FOR AROMATICS/SATURATES SEPARATION

CROSS-REFERENCE TO RELATED APPLICATION

This application is a Rule 60 Divisional of U.S. Ser. No. 775,886 filed Oct. 11, 1991, now U.S. Pat. No. 5,128,439.

BACKGROUND

The use of membranes to separate aromatics from saturates has long been pursued by the scientific and industrial community and is the subject of numerous patents.

U.S. Pat. No. 3,370,102 describes a general process for separating a feed into a permeate stream and a retentate stream and utilizes a sweep liquid to remove the permeate from the face of the membrane to thereby maintain the concentration gradient driving force. The process can be used to separate a wide variety of mixtures including various petroleum fractions, naphthas, oils, hydrocarbon mixtures. Expressly recited is the separation of aromatics from kerosene.

U.S. Pat. No. 2,958,656 teaches the separation of hydrocarbons by type, i.e., aromatic, unsaturated, saturated, by permeating a portion of the mixture through a non-porous cellulose ether membrane and removing permeate from the permeate side of the membrane using a sweep gas or liquid. Feeds include hydrocarbon mixtures, e.g., naphtha (including virgin naphtha, naphtha from thermal or catalytic cracking, etc.).

U.S. Pat. No. 2,930,754 teaches a method for separating hydrocarbons, e.g., aromatic and/or olefinic from gasoline boiling range mixtures by the selective permeation of the aromatic through certain non-porous cellulose ester membranes. The permeated hydrocarbons are continuously removed from the permeate zone using a sweep gas or liquid.

U.S. Pat. No. 4,115,465 teaches the use of polyurethane membranes to selectively separate aromatics from saturates via pervaporation. U.S. Pat. No. 5,028,685 discloses halogenated polyurethanes and membranes therefrom for separating aromatics from saturates.

U.S. Pat. Nos. 4,944,880 and 4,990,275 describe polyimide/aliphatic polyester copolymers and membranes therefrom for the separation of aromatics from saturates. U.S. Pat. Nos. 4,946,594 and 4,997,906 describes crosslinked copolymers of aliphatic polyester diols and dianhydrides and membranes therefrom for the separation of aromatics from saturates.

U.S. Pat. No. 4,976,868 covers the use of polyester membranes (e.g., polyethylene terephthalate, polybutylene terephthalate, and polyethylene terephthalate/-cyclohexane-dimethanol terephthalate) for aromatics/-saturates separation. U.S. Pat. Nos. 5,012,036, 5,012,035, and 5,019,666 teach the use of polyarylate, polyphthalatecarbonate, and non-porous polycarbonate membranes, respectively, to separate aromatics from saturates.

The present invention describes a process for the preparation of saturated aliphatic polyesters by reaction of oligomeric aliphatic polyester diols with diacid chlorides. The invention also describes a method to crosslink saturated aliphatic polyesters by thermal treatment. In addition, the invention describes the use of crosslinked membranes prepared from saturated aliphatic polyesters for the separation of aromatics from saturates.

Compared to distillation, membrane permeation can lead to considerable energy savings. A membrane can separate a mixture of aromatics and saturates, e.g., a heavy catalytic naphtha, into a high-octane, mainly aromatic permeate and a high-cetane, mainly saturated retentate. Both permeate and retentate are more valuable than the starting heavy catalytic naphtha.

SUMMARY OF THE INVENTION

The present invention is a method for the synthesis of saturated aliphatic polyesters by reaction of saturated or aromatic diacid chlorides with oligomeric aliphatic polyester diols. The invention also covers a method to thermally crosslink membranes prepared from the above polyesters and the use of the crosslinked membranes to separate aromatics from saturates.

DESCRIPTION OF THE PREFERRED EMBODIMENT

In the present invention, saturated polyesters are synthesized, membranes prepared from them are cast and thermally crosslinked and the resulting crosslinked membranes are used to separate aromatics from non-aromatics into an aromatic-enriched fraction and a non-aromatic-enriched fraction.

The membranes are useful for the separation of aromatics from saturates in petroleum and chemical streams, and have been found to be particularly useful for the separation of large substituted aromatics from saturates as are encountered in heavy catalytic naphtha streams. Other streams which are also suitable feed streams for aromatics-from-saturates separation are intermediate catalytic naphtha streams boiling at 93°-160° C., light aromatics content streams boiling in the 40°-150° C. range, light catalytic cycle oil boiling in the 200°-345° C. range as well as streams in chemical plants which contain recoverable quantities of benzene, toluene, xylenes (BTX) or other aromatics in combination with saturates. The separation techniques which may successfully employ the membranes of the present invention include perstraction and pervaporation.

Perstraction involves the selective dissolution of particular components contained in a mixture into the membrane, the diffusion of those components through the membrane and the removal of the diffused components from the downstream side of the membrane by the use of a liquid sweep stream. In the perstractive separation of aromatics from saturates in petroleum or chemical streams, the aromatic molecules present in the feed stream dissolve into the membrane film due to similarities between the membrane solubility parameter and those of the aromatic species in the feed. The aromatics then permeate (diffuse) through the membrane and are swept away by a sweep liquid which is low in aromatics content. This keeps the concentration of aromatics at the permeate side of the membrane film low and maintains the concentration gradient which is responsible for the permeation of the aromatics through the membrane.

The sweep liquid is low in aromatics content so as not to itself decrease the concentration gradient. The sweep liquid is preferably a saturated hydrocarbon liquid with a boiling point much lower or much higher than that of the permeated aromatics. This is to facilitate separation, as by simple distillation. Suitable sweep liquids, therefore, would include, for example, $C_3$ to $C_6$ saturated hydrocarbons and lube basestocks ($C_{15}$-$C_{20}$).

The perstraction process is run at any convenient temperature, preferably as low as possible.

The choice of pressure is not critical since the perstraction process is not dependent on pressure, but on the ability of the aromatic components in the feed to dissolve into and migrate through the membrane under a concentration driving force. Consequently, any convenient pressure may be employed, the lower the better to avoid undesirable compaction, if the membrane is supported on a porous backing, or rupture of the membrane, if it is not.

If $C_3$ or $C_4$ sweep liquids are used at 25° C. or above in liquid state, the pressure must be increased to keep them in the liquid phase.

Pervaporation, by comparison, is run at generally higher temperatures than perstraction and relies on vacuum on the permeate side to evaporate the permeate from the surface of the membrane and maintain the concentration gradient driving force which drives the separation process. As in perstraction, the aromatic molecules present in the feed dissolve into the membrane film, migrate through said film and emerge on the permeate side under the influence of a concentration gradient. Pervaporation separation of aromatics from saturates can be performed at a temperature of about 25.C for the separation of benzene from hexane but for separation of heavier aromatic/saturate mixtures, such as heavy catalytic naphtha, higher temperatures of at least 80° C. and higher, preferably at least 100° C. and higher, more preferably at least 120° C. and higher should be used. Temperatures of about 200° C. have been successfully used with crosslinked membranes, prepared from saturated polyesters, of the present invention, the maximum upper limit being that temperature at which the membrane is physically damaged. Vacuum on the order of 1-50 mm Hg is pulled on the permeate side. The vacuum stream containing the permeate is cooled to condense out the highly aromatic permeate. Condensation temperature should be below the dew point of the permeate at a given vacuum level.

The membrane itself may be in any convenient form utilizing any convenient module design. Thus, sheets of membrane material may be used in spiral wound or plate and frame permeation cell modules. Tubes and hollow fibers of membranes may be used in bundled configurations with either the feed or the sweep liquid (or vacuum) in the internal space of the tube or fiber, the other material obviously being on the other side.

When the membrane is used in a hollow fiber configuration with the feed introduced on the exterior side of the fiber, the sweep liquid flows on the inside of the hollow fiber to sweep away the permeated highly aromatic species, thereby maintaining the desired concentration gradient. The sweep liquid, along with the aromatics contained therein, is passed to separation means, typically distillation means, however, if a sweep liquid of low enough molecular weight is used, such as liquefied propane or butane, the sweep liquid can be permitted to simply evaporate, the liquid aromatics being recovered and the gaseous propane or butane (for example) being recovered and reliquefied by application of pressure or lowering of temperature.

Saturated aliphatic polyesters are not available in high-molecular-weight form. Some of them, e.g., polyethyleneadipate, are available in the form of oligomeric diols. The present invention shows that oligomeric polyester diols can be reacted with saturated diacid chlorides to give high-molecular-weight polyesters, which can then be used to make membranes. The oligomeric polyester diol can be, e.g., a polyethyleneadipatediol, a polyethylenesuccinatediol, a polymalonatediol, a polyoxalatediol, or a polyglutaratediol of molecular weight between about 500 and 5000. The diacid chloride can be aliphatic, cycloaliphatic or aromatic, such as all linear diacid chlorides from oxalyl to sebacoyl (oxalyl chloride, malonyl chloride, succinyl chloride, glutaryl chloride, adipoyl chloride, pimeloyl chloride, suberoyl chloride, azelaoyl chloride, and sebacoyl chloride), 1,2-cyclobutanedicarbonyl chloride, isophthaloyl chloride, and terephthaloyl chloride. Mixtures of diacid chlorides and/or of polyester diols can also be used. A tertiary amine, e.g., pyridine, triethylene diamine or triethylamine, can be used to trap the hydrochloric acid formed during the reaction. In addition, a solvent, e.g., a chlorinated aliphatic hydrocarbon such as chloroform, 1,2-dichloroethane or methylene chloride, or an aromatic such as benzene, toluene, xylene or chlorobenzene, can be used during the reaction or added at the end to achieve the desired fluidity. Membranes are cast, the solvent evaporated and then the membranes are heated to crosslink them. Then the membranes are washed with water to remove the tertiary amine hydrochloride and then dried in an oven.

The membranes are used to separate aromatics from saturates in a pervaporation apparatus. The pervaporation apparatus is a cell, separated into two compartments by a porous metal plate, on which the membrane is supported. During a pervaporation experiment the aromatics/saturates mixture is circulated through the upper compartment at the desired temperature. The lower compartment is kept at reduced pressure. The permeate is collected in a trap cooled with dry ice-acetone or dry ice-isopropanol and periodically analyzed by gas chromatography. The feed contains 20 wt% isooctane, 10% toluene, 30% n-octane and 40% p-xylene. The following examples illustrate the invention.

EXAMPLE 1

The reaction apparatus was a 150 ml glass vessel, equipped with stirrer, thermometer and gas-inlet tube. The reactor content was kept under nitrogen. 10 g of dry polyethyleneadipatediol, of average molecular weight 500 (20 mmoles), 3.16 g of anhydrous pyridine (40 mmoles) and 30 ml of anhydrous 1,2-dichloroethane were put into the reactor.

When everything was dissolved, 4.78 g of sebacoyl chloride (20 mmoles), dissolved in 10 ml of dichloroethane, was added to the reactor content. The reaction began immediately, as shown by increasing solution thickness (viscosity). When the reaction mixture was thick enough to cast, it was centrifuged, which led to formation of a top, clear layer and a bottom opaque layer. The top layer was used to cast two membranes on Gore-tex (porous teflon) sheets. After the solvent evaporated, one of the membranes was covered with another Gore-tex sheet. Then the membrane was heated in a nitrogen-purged oven at 100° C., 150° C. and 200° C., each for 15 hours. Then the membrane was immersed in water to remove pyridinium chloride, dried and heated at 250° C. for 7 hours. The membrane was evaluated in a pervaporation cell by the use of a feed consisting of 20% (by weight) isooctane, 10% toluene, 30% n-octane and 40% p-xylene.

The following table gives the pervaporation results.

| Temperature (°C.) | Toluene/n-Octane Separation Factor | Normalized Flux (Kg · μM/M² · D) |
|---|---|---|
| 150 | 5.3 | 1000 |
| 170 | 5.0 | 1100 |
| 190 | 6.1 | 1820 |
| 210 | 5.5 | 3050 |

EXAMPLE 2

20 g of polyethyleneadipatediol, molecular weight 500 (40 mmoles), 8.12 g of terephthaloyl chloride (40 mmoles) and 6.33 g of pyridine (80 mmoles) were put into the same reactor as described in Example 1. Heating to melt the diol caused the reaction to begin and the temperature to climb to 90° C. After adding 40 ml of chloroform the reaction was allowed to continue overnight.

A membrane was cast on glass. After evaporating the solvent, the membrane was heated at 200° C. and 250° C., each time for 15 hours. The initially tacky membrane became non-tacky and insoluble in chloroform, i.e., crosslinked.

EXAMPLE 3

20 g of polyethyleneadipatediol, molecular weight 500 (40 mmoles), 8.12 g of terephthaloyl chloride (40 mmoles) and 6.33 g of pyridine (80 mmoles) were charged into the same reactor as described in Example 1. Stirring caused the temperature to climb to 50° C. 25 ml of 1,2-dichloroethane was added, then the solution was refluxed for a total of 15 hours, during which 30 ml of dichloroethane was added to maintain the necessary fluidity. After cooling, three membranes were cast on Gore-tex. One of them was covered with another sheet of Gore-tex and heated in a nitrogen-purged oven at 100° C., 150° C., 200° C. and 225° C., each for 15 hours. Then the membrane was washed with water to remove pyridine hydrochloride. The membrane so obtained was evaluated in a permeation cell by the use of the same feed as in Example 1. The following table gives the results.

| Temperature (°C.) | Toluene/n-Octane Separation Factor | Normalized Flux (Kg · μM/M² · D) |
|---|---|---|
| 150 | 5.2 | 4760 |
| 170 | 4.4 | 3150 |
| 190 | 3.6 | 4100 |
| 210 | 3.5 | 6680 |

What is claimed is:

1. A method for separating mixtures of aromatics and non-aromatics into aromatic-enriched and non-aromatic-enriched streams comprising:
   a) contacting said aromatics/non-aromatics mixture with one side of a crosslinked membrane prepared by reacting an oligomeric aliphatic polyester diol with a saturated or aromatic diacid chloride, and
   b) selectively permeating the aromatic components of the mixture through the membrane.

2. The method of claim 1 wherein the oligomeric polyester diol is selected from the group consisting of polyethyleneadipatediol, polyethylenesuccinatediol, polymalonatediol, polyoxalatediol, a polyglutaratediol, and mixtures thereof.

3. The method of claim 1 wherein the saturated or aromatic diacid chloride is selected from the group consisting of oxalyl chloride malonyl chloride, succinyl chloride, glutaryl chloride, adipoyl chloride, pimeloyl chloride, suberoyl chloride, azelaoyl chloride, sebacoyl chloride, isophthaloyl chloride, terephthaloyl chloride, and mixtures thereof.

4. The method of claim 1 wherein the aromatics/non-aromatics mixture is selected from the group consisting of heavy catalytic naphtha streams, intermediate catalytic naphtha streams, light aromatics streams boiling in the 40°–150° C. range, and light catalytic cycle oils boiling in the 200°–345° C. range.

* * * * *